United States Patent
Lombardi et al.

(10) Patent No.: US 9,628,275 B2
(45) Date of Patent: Apr. 18, 2017

(54) COMMUNICATION DEVICE, METHOD AND SYSTEM FOR ESTABLISHING COMMUNICATIONS USING THE SUBSCRIBER IDENTITY DATA OF ANOTHER COMMUNICATION DEVICE

(71) Applicant: BlackBerry Limited, Waterloo (CA)

(72) Inventors: Robert Joseph Lombardi, Hamilton (CA); Jasmin Mulaosmanovic, Waterloo (CA)

(73) Assignee: BlackBerry Limited, Waterloo (CA)

( * ) Notice: Subject to any disclaimer, the term of this patent is extended or adjusted under 35 U.S.C. 154(b) by 12 days.

(21) Appl. No.: 14/845,523

(22) Filed: Sep. 4, 2015

(65) Prior Publication Data

US 2017/0070346 A1 Mar. 9, 2017

(51) Int. Cl.
*H04L 9/00* (2006.01)
*H04L 9/30* (2006.01)
*H04W 4/00* (2009.01)
*H04W 12/04* (2009.01)
*H04W 12/08* (2009.01)

(52) U.S. Cl.
CPC .............. *H04L 9/30* (2013.01); *H04W 4/008* (2013.01); *H04W 12/04* (2013.01); *H04W 12/08* (2013.01)

(58) Field of Classification Search
CPC ........ H04L 9/30; H04W 12/08; H04W 12/04; H04W 4/008
See application file for complete search history.

(56) References Cited

U.S. PATENT DOCUMENTS

| | | | | |
|---|---|---|---|---|
| 5,361,062 A | * | 11/1994 | Weiss ........................ | G06F 21/34 235/382 |
| 5,485,519 A | * | 1/1996 | Weiss ........................ | G06F 21/31 235/379 |
| 7,974,606 B2 | * | 7/2011 | Lo ............................ | G06Q 20/4012 455/41.2 |
| 8,311,532 B2 | | 11/2012 | Waller | |
| 8,452,258 B2 | | 5/2013 | Waller | |
| 8,571,564 B2 | | 10/2013 | Horn | |

(Continued)

FOREIGN PATENT DOCUMENTS

WO    WO 2010/111002    9/2010

OTHER PUBLICATIONS

Sarah Clark, "Apple patents 'SIM within' secure element technology", NFC World, Nov. 9, 2011, 4 pages, http://www.nfcworld.com/2011/11/09/311213/apple-patents-sim-within-secure-element-technology/.

Steve Anderson, "Movirtu's CloudPhone Offers Mobile Phone Service on Wi-Fi, No SIM Required", Web RTC World, Feb. 7, 2014, 3 pages, http://www.webrtcworld.com/topics/webrtc-world/articles/369524-movirtus-cloudphone-offers-mobile-phone-service-wi-fi.htm.

(Continued)

*Primary Examiner* — Beemnet Dada
(74) *Attorney, Agent, or Firm* — Ridout and Maybee LLP

(57) ABSTRACT

A communication system may include a pair of mobile wireless communications each including a contactless short-range communication subsystem. The first mobile wireless communications obtains subscriber identity data from the second mobile wireless communication when input matching a shared secret is provided on the second mobile wireless communication. The subscriber identity data from the first mobile wireless communication is subsequently used by the second mobile wireless communication to establish a wireless voice and/or data communication session on the second mobile wireless communication using the subscriber identity data of the first mobile wireless communication.

20 Claims, 3 Drawing Sheets

(56) References Cited

U.S. PATENT DOCUMENTS

| | | |
|---|---|---|
| 8,606,232 B2 | 12/2013 | Siu |
| 8,606,933 B1 * | 12/2013 | Gossweiler, III ... H04M 1/6066 709/227 |
| 8,666,368 B2 | 3/2014 | Schell |
| 8,725,139 B2 | 5/2014 | Waller |
| 8,874,081 B2 | 10/2014 | Horn |
| 9,065,935 B2 | 6/2015 | Jerath |
| 9,288,228 B2 * | 3/2016 | Suumaki ................. H04L 63/18 |
| 2008/0261561 A1 | 10/2008 | Gehrmann |
| 2011/0059738 A1 | 3/2011 | Waller |
| 2011/0269423 A1 | 11/2011 | Schell |
| 2013/0095784 A1 | 4/2013 | Jerath |
| 2014/0050110 A1 | 2/2014 | Jerath |
| 2014/0066011 A1 | 3/2014 | Bradley |
| 2014/0128024 A1 | 5/2014 | Horn |
| 2015/0134958 A1 | 5/2015 | Merrien et al. |

OTHER PUBLICATIONS

Unknown Author, Movirtu Virtual SIM Platform, Movirtu, Mar. 19, 2015, 2 pages, http://www.movirtu.com/#!virtual-sim-platform/c13j0.

Unknown Author, Movirtu CloudPhone Product Sheet v3, at least as early as Jul. 18, 2015, 2 pages.

Unknown Author, Movirtu ManyMe Product Sheet v10, at least as early as Jul. 18, 2015, 2 pages.

Unknown Author, Movirtu Share Product Sheet v9, at least as early as Jul. 18, 2015, 2 pages.

Unknown Author, Movirtu WorkLife Product Sheet v11, at least as early as Jul. 18, 2015, 2 pages.

Extended European Search Report; EP 16177257.9; Jan. 18, 2017.

* cited by examiner

COMMUNICATION DEVICE, METHOD AND SYSTEM FOR ESTABLISHING COMMUNICATIONS USING THE SUBSCRIBER IDENTITY DATA OF ANOTHER COMMUNICATION DEVICE

TECHNICAL FIELD

The present disclosure relates generally to the field of communications, and more particularly to wireless communications systems and related methods.

BACKGROUND

Wireless communication devices, such as smartphones and tablets, continue to grow in popularity and have become an integral part of both personal and business communications. Various mobile wireless communication devices now incorporate features such as email, text and instant messaging, calendars, address books, task lists, calculators, memo and writing programs, media players, games, etc. These multi-function devices usually allow email messages to be sent and received wirelessly, as well as access the internet via a cellular network and/or a wireless local area network (WLAN), for example.

Some wireless communication devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DESCRIPTION OF EXAMPLE EMBODIMENTS

Figure 1:
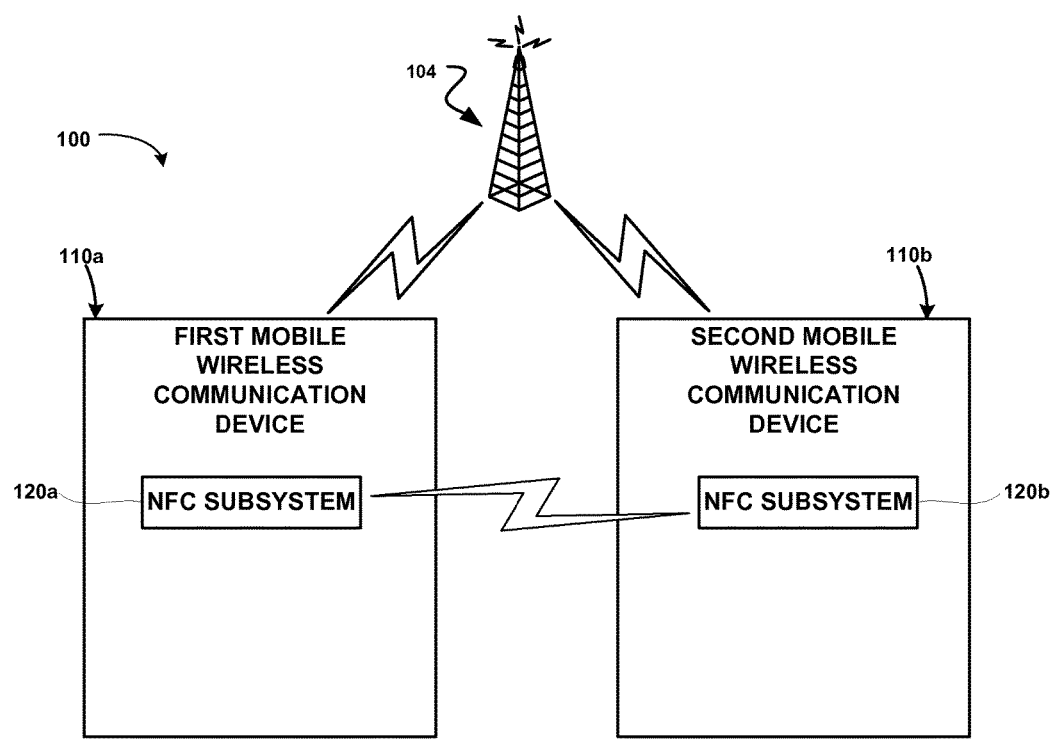
FIG. 1 is a schematic block diagram of an example embodiment of a wireless communication system.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with an example embodiment of one aspect of the present disclosure, there is provided a method for establishing communications on one communication device using the subscriber identity data of another communication device, the method comprising: establishing a contactless short-range communication connection between a first mobile wireless communications device and a second mobile wireless communications device; receiving, by the second mobile wireless communications device, subscriber identity data and a shared secret from the first mobile wireless communications device, wherein the subscriber identity data is received in encrypted form; receiving, on the second mobile wireless communications device, input via an input device; determining, on the second mobile wireless communications device, whether the received input matches the shared secret; decrypting, on the second mobile wireless communications device, the subscriber identity data using the shared secret; and establishing, by the second mobile wireless communications device, a wireless voice and/or data communication session using the decrypted subscriber identity data.

In accordance with an example embodiment of another aspect of the present disclosure, there is provided a mobile wireless communication device, comprising: a contactless short-range communication subsystem; an input device; a wireless communication subsystem; a controller coupled to the contactless short-range communication subsystem, input device and wireless communication subsystem, the controller configured for: establishing a contactless short-range communication connection between a first mobile wireless communications device and a second mobile wireless communications device; receiving, by the second mobile wireless communications device, subscriber identity data and a shared secret from the first mobile wireless communications device, wherein the subscriber identity data is received in encrypted form; receiving, on the second mobile wireless communications device, input via an input device; determining, on the second mobile wireless communications device, whether the received input matches the shared secret; decrypting, on the second mobile wireless communications device, the subscriber identity data using the shared secret; and establishing, by the second mobile wireless communications device, a wireless voice and/or data communication session using the decrypted subscriber identity data.

In accordance with an example embodiment of a further aspect of the present disclosure, there is provided a non-transitory machine readable medium having tangibly stored thereon executable instructions that, when executed by a processor of a mobile wireless communications device, cause the processor to perform a method for establishing communications on one communication device using the subscriber identity data of another communication device, the method comprising: establishing a contactless short-range communication connection between a first mobile wireless communications device and a second mobile wireless communications device; receiving, by the second mobile wireless communications device, subscriber identity data and a shared secret from the first mobile wireless communications device, wherein the subscriber identity data is received in encrypted form; receiving, on the second mobile wireless communications device, input via an input device; determining, on the second mobile wireless communications device, whether the received input matches the shared secret; decrypting, on the second mobile wireless communications device, the subscriber identity data using the shared secret; and establishing, by the second mobile wireless communications device, a wireless voice and/or data communication session using the decrypted subscriber identity data.

In accordance with an example embodiment of yet a further aspect of the present disclosure, there is provided a communication system comprising: a first mobile wireless communications device comprising: a contactless short-range communication subsystem; a memory; a wireless communication subsystem; a controller coupled to the contactless short-range communication subsystem, memory and wireless communication subsystem, the controller configured for: encrypting subscriber identity data and a shared secret; and storing the encrypted subscriber identity data and shared secret in the memory of the contactless short-range communication subsystem when a low battery condition is detected; a second mobile wireless communications device comprising: a contactless short-range communication subsystem; an input device; a wireless communication subsystem; a controller coupled to the contactless short-range communication subsystem, input device and wireless communication subsystem, the controller configured for: establishing a contactless short-range communication connection between a first mobile wireless communications device and a second mobile wireless communications device; receiving, by the second mobile wireless communications device, subscriber identity data and a shared secret from the first mobile wireless communications device, wherein the subscriber identity data is received in encrypted form; receiving, on the second mobile wireless communications device, input via an input device; determining, on the second mobile wireless communications device, whether the received input matches the shared secret; decrypting, on the second mobile wireless communications device, the subscriber identity data using the shared secret; and establishing, by the second mobile wireless communications device, a wireless voice and/or data communication session using the decrypted subscriber identity data.

FIG. 1 illustrates a wireless communication system 100 according to the present disclosure in which two mobile wireless communications devices 110a, 110b are brought within close proximity of each other, either into very close or actual physical contact. Each of the two mobile wireless communications devices 110a, 110b include NFC subsystems 120a, 120b, respectively, for communicating with each other. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used. In at least some embodiments, it is contemplated that the NFC subsystems 120a, 120b are configured for operating in either an active communication mode or a passive communication mode, as will be described in more detail below.

When the two mobile wireless communications devices 110a, 110b are brought within close proximity of each other, an NFC communication link (or connection) is established between the mobile wireless communications devices 110a, 110b using the NFC communication protocol. The mobile wireless communications devices 110a, 110b can then communicate and exchange from each other using the NFC communication protocol. For example, subscriber identity data, secrets (e.g., such as passcodes), personal identification number (PIN) and security keys could be exchanged using NFC.

The NFC subsystems 120a, 120b of the mobile wireless communications devices 110a, 110b may be in a full power mode (or state) because the mobile wireless communications devices 110a, 110b are powered-on, or may be in a low power mode (or state) (e.g., sleep mode) because the mobile wireless communications devices 110a, 110b are powered-off or in a low power mode (e.g. sleep mode). As will be explained in detail below, it is possible for one mobile wireless communications device 110a to establish communication with the other mobile wireless communications device 110b using a passive communication mode by touching the mobile wireless communications devices 110a to the mobile wireless communications device 110b, thus initiating a NFC connection with the mobile wireless communications device 110b.

NFC technology is an extension of the ISO 14443 proximity-card standard as a contactless card, RFID standard that incorporates the interface of a smart card and a reader into one device. The NFC subsystems 120a, 120b of the mobile wireless communications devices 110a, 110b typically comprises an NFC integrated circuit (IC) chip that communicates with other NFC-enabled devices such as existing ISO 14443 smart cards and readers and other NFC devices and is compatible with any existing contactless infrastructure. The NFC IC chips use magnetic field induction in which two loop antennas are located near each other and form an air-core transformer. The technology operates on the unlicensed radio frequency ISM band of about 13.56 MHz and has a bandwidth of about 2 MHz. The working distance is usually about 0 to 20 centimeters. A user of the NFC device brings one NFC-enabled device close to another NFC-enabled device to initiate NFC communication, with data rates ranging from 106 kbit/s to about 424 kbit/s.

There are different modes of operation. Most mobile wireless communications devices operate in an active communications mode using a modified Miller and 100% amplitude shift keyed (ASK) code unless a passive mode is used in which a Manchester and ASK code is used. Further details are set forth in the Mobile NFC Technical Guidelines, Version 2.0, November 2007 by GSMA, the disclosure of which is hereby incorporated by reference in its entirety.

The "Near Field Communications Interface and Protocol" or "NFCIP-1" or "the NFC protocol" allows for communication between an initiator device and a target device, when the initiator device and the target device are brought close together. In the example above, the first mobile wireless communications device 110a can be an initiator and the second mobile wireless communications device 110b could be the target device, and operate as a passive device. Detailed information about NFCIP-1 is available in a published standard called ECMA-340, which is available from Ecma International at www.ecma-international.org, the disclosure of which is hereby incorporated by reference in its entirety.

The NFC protocol operates within the globally available and unregulated radio frequency band of 13.56 MHz and has a working distance of up to 20 centimeters. Three data rates are typically available: 106 kilobits per second (kbit/s), 212 kbit/s, and 424 kbit/s. As noted before, multiple modes of communication are currently available. In the passive communication mode, the initiator device provides an electromagnetic carrier field and the target device answers the initiator device by modulating the carrier field. In the passive communication mode, the target device may draw operating power from the carrier field provided by the initiator device. Advantageously, only the initiator device is required to have a power supply. The modulating magnetic field created by the target device could be used for communicating a limited amount of data.

In the active communication mode, both the initiator device and the target device generate their own electromagnetic field. For example, the mobile wireless communications devices 110a, 110b could generate their own electromagnetic field. The initiator device starts the NFCIP-1 communication. The target device can respond to a command received from the initiator device in the active communication mode by modulating the electromagnetic field generated by the target device. Typically, in the active communication mode, both devices require a power supply. Notably, in the active communication mode, both of the mobile wireless communications devices 110a, 110b can act as either initiator or target, while this is not the case in the passive communication mode, wherein the device without the ability to create an electromagnetic carrier field cannot be an initiator device and instead becomes the target device. It should be noted that one of the mobile wireless communications devices 110a, 110b may lack the ability to create an electromagnetic carrier field and operate in the passive communication mode, for example, because the device is powered-off, in a low power mode (e.g., sleep mode), or the battery of the device has insufficient power for the NFC subsystem to operate in the active communication mode.

According to NFCIP-1, responsive to sensing modulation of the initiator electromagnetic carrier field by the target device, the initiator device performs an initial collision avoidance sequence by transmitting an ATR_REQ (attribute request) command to the target device. Responsive to receiving the ATR_REQ (attribute request) command, the target device transmits a response called ATR_RES (attribute response).

Figure 2:
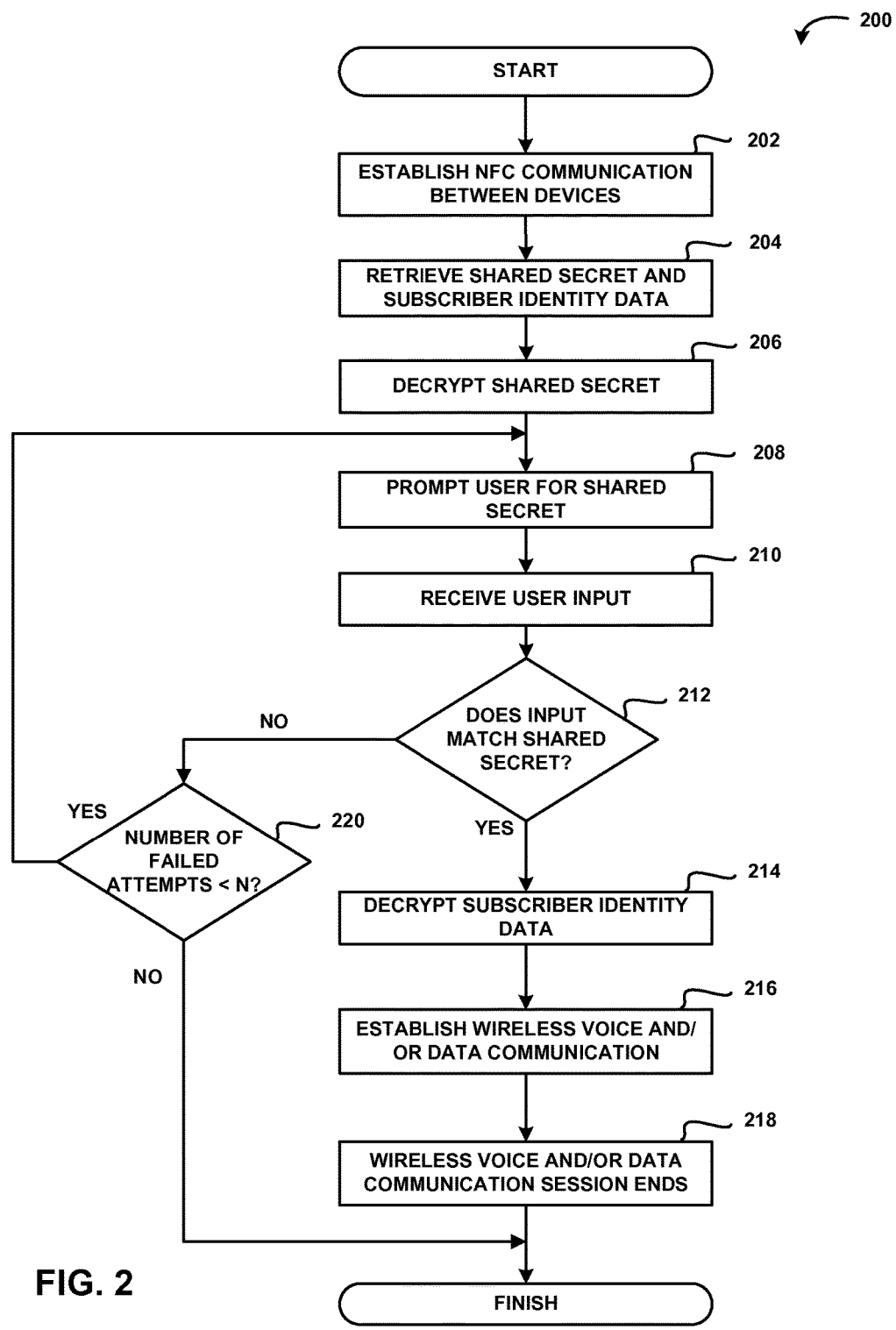
FIG. 2 is a flowchart illustrating operation of the wireless communication system of FIG. 1.

Referring again to FIG. 1 and more particularly to the method shown in FIG. 2, the device-to-device communication using NFC allows data from one mobile wireless communications device to be shared with another mobile wireless communications device even when one of the mobile wireless communications devices is in a passive communication mode, for example, because it is powered-off, in a low power mode (e.g., sleep mode), or the battery of the device has insufficient power for the NFC subsystem to operate in the active communication mode. In this way, data stored in the NFC subsystem of the target device may be retrieved by the initiator device. When the retrieved data is subscriber identity data, a wireless voice and/or data communication session may be established on the initiator device using the retrieved subscriber identity data in accordance with the method of FIG. 2, as described below.

Each of the first and second mobile communication devices 110a, 110b are equipped with a SIM share module or application 390 which configure the devices 110a, 110b for performing a method 200 (FIG. 2) for establishing communications using the subscriber identity data of another communication device, described below.

The SIM share module 390 may be configured during an initial device setup or at a later time, for example, when the SIM share module 390 is installed after the initial device setup or when the user decides to take advantage of the features of the SIM share module 390. The SIM share module 390 may allow the user to specify whether subscriber identity data may be shared with other devices, and if so, may allow the user to specify a shared secret (such as a passcode) for decrypting the subscriber identity data. The shared secret could be the same or different than a network password used for accessing the services of the wireless network service provider, depending on the embodiment. For greater security, the shared secret should be different than the network password used for accessing the services of the wireless network service provider.

Reference is now made to FIG. 2 which illustrates a flowchart of a method 200 for establishing communications on the second mobile wireless communication device 110b using the subscriber identity data of the first mobile wireless communication device 110a of the communication system 100. Each of the first and second mobile communication devices 110a, 110b are equipped with a SIM share module 390 which configures the devices 110a, 110b for performing the method 200. Coding of software for carrying out such a method 200 is within the scope of a person of ordinary skill in the art provided the present disclosure. The method 200 may contain additional or fewer processes than shown and/or described, and may be performed in a different order. Machine-readable code executable by the processor 302 to perform the method 200 may be stored in a machine-readable medium such as a memory of a mobile wireless communication device.

At 202, an NFC connection is established between the first mobile wireless communication device 110a and the second mobile wireless communication device 110b so that the mobile wireless communications devices 110a, 110b can communicate and exchange data using NFC. The NFC connection is established by bringing the mobile wireless communication devices 110a, 110b into close proximity. It is contemplated that the first wireless communication device 110a could be in the passive (NFC) communication mode and that the second wireless communication device 110b is in the active (NFC) communication mode. In such cases, the second mobile wireless communication device 110b acts as the initiator and the first mobile wireless communication device 110a acts as the target. The first mobile wireless communication device 110a may be in the passive communication mode because it is powered-off, in a low power mode (e.g., sleep mode), or its battery has insufficient power for the NFC subsystem 120a to operate in the active communication mode.

At 204, the second mobile wireless communication device 110b retrieves subscriber identity data and the shared secret for accessing the subscriber identity data from a persistent memory of the NFC subsystem 120a of the first mobile wireless communication device 110a using the NFC connection.

The subscriber identity data and the shared secret are received in encrypted form in at least some embodiments. The subscriber identity data and the shared secret are typically encrypted and stored in the persistent memory 378 of the NFC subsystem 120a of the first mobile wireless communication device 110a in response to configuring the SIM share module 390 for sharing subscriber identity data, as described above. This ensures that the subscriber identity data and the shared secret are available should the first mobile wireless communication device 110a encounter a low battery condition, thereby ensuring that subscriber identity data and the shared secret are available in encrypted form for access by another device such as the second mobile wireless communication device 110b. Alternatively, in other embodiments the subscriber identity data and the shared secret may be stored in the persistent memory of the NFC subsystem 120a when the first mobile wireless communication device 110a powers-off or enters a low power mode (e.g., sleep mode), for example, due to a low battery condition. In some examples, the entire memory 378 of the NFC subsystem 120a may be encrypted or the subscriber identity data and the shared secret may be stored in an encrypted area of the memory 378 of the NFC subsystem 120a. The encrypted data received from the first mobile wireless communication device 110a, i.e. the encrypted subscriber identity data and shared secret, Alternatively, in other embodiments the subscriber identity data and the shared secret may not be stored in the persistent memory 378 of the NFC subsystem 120a of the first mobile wireless communication device 110a at all.

Instead, the subscriber identity data and the shared secret may be encrypted and transferred to another device such as the second mobile wireless communication device 110b on-demand when the first mobile wireless communication device 110a is powered-on.

The subscriber identity data and shared secret may be retrieved from the first mobile wireless communication device 110a in response to user input received on the second mobile wireless communication device 110b. The user input could be the starting of a particular application on the second mobile wireless communication device 110b such as a SIM share application, input received via a particular application operating on the second mobile wireless communication device 110b such as a SIM share application, among other possibilities.

At 206, the second mobile wireless communication device 110b decrypts the encrypted shared secret. The shared secret may be decrypted using a decryption algorithm stored, for example, in a protected memory of the second mobile wireless communication device 110b. The protected memory is inaccessible to users and unauthorized applications, for example, access to the protected memory may be limited to the SIM share module 390. The protected memory of the second mobile wireless communication device 110b is persistent memory such as the memory 360. The use of a shared secret and the encryption of the shared secret to access the subscriber identity data assist to prevent against malicious attacks.

At 208, the second mobile wireless communication device 110b prompts the user for input. The prompt is typically a message displayed on a display of the second mobile wireless communication device 110b. The requested security input may be, for example, text input such as a password, passcode or PIN. In such cases, the message displayed on the display of the second mobile wireless communication device 110b may include a text entry field, similar to those well known in the art.

At 210, the second mobile wireless communication device 110b receives input from the user. At 212, the second mobile wireless communication device 110b determines whether the receiver user input matches the shared secret. If the input matches the shared secret, the user is verified and the operations proceed to 214 where the second mobile wireless communication device 110b decrypts the encrypted subscriber identity data received in 204 using the shared secret as a decryption key. In an example embodiment, the subscriber identity data is encrypted and decrypted using a symmetric-key algorithm that allows the same the same cryptographic key, i.e. the shared secret, to be used for both encryption of the plaintext subscriber identity data on the first mobile wireless communication device 110a and decryption of the encrypted (or ciphertext) subscriber identity data. It will be understood that in symmetric-key algorithm the key to be used for encryption and the key used for decryption may be identical or the keys may be a simple transformation of each other. The encryption and decryption algorithms, or symmetric-key algorithm, may be stored in a protected memory of the second mobile wireless communication device 110b.

The subscriber identity data (also referred to as Subscriber Identity Module (SIM) data) includes information necessary to obtain access to a wireless voice and/or data network provided by a wireless network service provider, depending on the embodiment. The subscriber identity data typically includes a phone number, voice and/or data plan information, an address book, and passcodes and/or security keys used to prevent unauthorized access to the device 110. The subscriber identity data includes network operator bundle information and/or user data information. Examples of network operator bundle information and/or user data information include subscriber identification information, network selection parameters, network operator data and application data for accessing various data services, etc. In one embodiment, the subscriber identity data stored in the persistent memory of the NFC subsystem 120a comprises subscriber identification information, network selection parameters, and network operator data (sometimes referred to as "network credentials"). In other embodiments, the subscriber identity data stored in the persistent memory of the NFC subsystem 120a may include more or less information. For example, in some embodiments, the subscriber identity data stored in the persistent memory of the NFC subsystem 120a may further comprise application data.

Examples of subscriber identification information include, without limitation, International Mobile Subscriber Identity (IMSI), Integrated Circuit Card ID (ICCID), Temporary Mobile Subscriber Identity (TMSI), Packet TMSI (P-TMSI), and Mobile Subscriber Integrated Services Digital Network Number (MSISDN). Example network selection parameters include, without limitation, Public Land Mobile Network Selector (PLMNSel), Forbidden PLMN (FPLMN), and Home PLMN (HPLMN). Examples of network operator data include, without limitation, Operator controlled PLMN (OPLMN) list SPN (Service Provider Name), PLMN Network Name (PNN) for name display, Emergency Control Center (ECC) for emergency calls, and other call categories, etc. Examples of application data include, without limitation, the SIM Application Toolkit (STK) (e.g., Roaming Broker, Enhanced Network Selection (ENS), International Mobile Equipment Identity (IMEI) change applications, etc.)

In some embodiments, the subscriber identity data may further comprise authentication information, such as keys, and encryption algorithms, etc. For example, authentication information may comprise an authentication key (Ki) and the encryption algorithms described in 3GPP TS 35.205 V9.0.0 published Dec. 31, 2009 and entitled "Specification of the MILENAGE Algorithm Set: An example algorithm set for the 3GPP authentication and key generation functions f1, f1*, f2, f3, f4, f5 and f5*", the disclosure of which is hereby incorporated by reference in its entirety.

In the described embodiment, the user may be given a predetermined number (N) of attempts, and the operations 200 end after N unsuccessful attempts resulting from N inputs which do not match the shared secret are received by the second mobile wireless communication device 110b. Alternatively, in other embodiments, if the input does not match the shared secret, the operations 200 end.

At 212, if the input does not match the shared secret, a failed attempt counter is incremented by 1 and the operations 200 proceed to 220 where it is determined whether the number of failed attempts is less than N. If the number of failed attempts is less than N, the operations 200 return to 208 where the user is prompted for input. If the number of failed attempts is not less than N, the operations 200 end.

At 216, the second mobile wireless communication device 110b establishes a wireless voice and/or data communications session with the wireless network 104 using the subscriber identity data received from the first second mobile wireless communication device 110a. Depending on the devices 110a, 110b and the wireless network 104, establishing a communications session may comprise, before the wireless voice and/or data communications session is established, one or more of notifying the wireless network service provider for the wireless voice and/or data communications session that the received subscriber identity data will be used with a different device 110b, obtaining permission from the wireless network service provider to use the received subscriber identity data on the second mobile wireless communication device 110b, or authenticating the second mobile wireless communication device 110b for use on the wireless network 104. In addition, depending on the devices 110a, 110b and the wireless network 104, establishing a communications session may comprise, before the wireless voice and/or data communications session is established, configuring the second mobile wireless communication device 110b for use with the wireless network 104, or possibly multiple other wireless networks, if the access of the second mobile wireless communication device 110b was restricted to one or more wireless networks which do not include the wireless network 104. Methods of performing these preliminary operations before establishing a communications session are known in the art, and will not be described in detail herein.

The second mobile wireless communication device 110b may establish the wireless voice and/or data communication session with the wireless network 104 as a secure session within a protected application space similar to an ad-hoc secure (or managed) workspace. A secure workspace is an environment where a user can securely access software and resources. The secure workspace provides a secure container that protects and segregates applications and data used in the session from the applications and data stored locally on the second mobile wireless communication device 110b. While data associated with the session may be temporarily stored by the second mobile wireless communication device 110b, when the session or secure workspace is ended, the data used in the session is deleted. Methods of implementing a secure container such as a secure (or managed) workspace are known in the art and will not be described herein.

The wireless network service provider of the wireless network 104 typically requires that wireless users properly authenticate before services are provided. For example, the wireless network service provider may maintain subscriber identity data that is used in determining whether a given user is authorized to use the services of the provider. Unauthorized users will be denied service. Authorized users will be allowed to establish voice and/or data communication links to the wireless network 104, for example, to make and receive voice telephone calls, to download and upload data, or to otherwise obtain the services available from the wireless network service provider.

At 218, the wireless voice and/or data communication session ends, for example, in response to user input on the second mobile wireless communication device 110b. The subscriber identity data and shared secret received from the first mobile wireless communication device 110ba, as well as the data associated with the wireless voice and/or data communication session is deleted from the memory of second mobile wireless communication device 110b.

The present disclosure describes techniques that allow communications with a wireless voice and/or data network to be established using the subscriber identity data of another mobile wireless communication device. The present disclosure, in many ways, mimics a physical SIM card from a first mobile wireless communication device on a second mobile wireless communication device by obtaining the subscriber identity data from the first mobile wireless communication device and using the subscriber identity data on the second mobile wireless communication device. A user with wireless voice services may use his or her network credentials on a borrowed device to access those wireless voice services. Advantageously, a user can make a telephone call on another voice-enabled mobile wireless communication device when his or her device will not power on (for example, because the battery is dead or does not have sufficient power) or the other voice-enabled mobile wireless communication device has better reception or access to better wireless networks (for example, due to a better wireless communication subsystem 311). This allows the user to borrow the device of a friend, family member or stranger to make a call while still using his or her wireless data plan. This may be particularly useful, for example, when the user intends to make a long distance call. Similarly, a user with wireless data services may use his or her network credentials on a borrowed device to access those wireless data services. This may be particularly useful, for example, when the user intends to access a lot of data, such as streaming audio/video data or downloading a large file for viewing, and the borrowed device does not have access to such data services or has access to such data services at less preferred rates or other conditions. The present disclosure in essence allows a user to login to the wireless network using his or her subscriber identity data from their SIM card on another user's device, for example, because their device has a dead battery or the other device has better reception or access to better wireless networks (for example, due to a better wireless communication subsystem 311). The user can use another person's device for a short period of time, for example to make a call or download a file such as a presentation, etc., log off the wireless network and return the device to the lender.

Variations of the operations 200 are possible. For example, while the wireless voice and/or data communications session has been described as occurring with a secure container, the entire operation 200 may be implemented in a secure container so that the subscriber identity data and the shared secret received from the first mobile wireless communication device 110a are segregated from the local applications and data along with the session data, and are automatically deleted with the operations 200 (i.e., when the SIM share module is terminated). For another example, the shared secret may be received first and the subscriber identity data may only by retrieved if input matching the shared secret is received in the manner described above. In yet other embodiments, the use of a shared secret may be omitted. In yet other embodiments, the shared secret may not be encrypted. In yet other embodiments, the subscriber identity data may not be encrypted.

In addition, while example embodiments in which the first mobile wireless communication device 110a has a dead battery or low battery condition have been described, it will be appreciated that the above-described methods can be used when the first mobile wireless communication device 110a is powered-on. For example, because the second mobile wireless communication device 110b has better wireless reception that the first mobile wireless communication device 110a due to hardware or other differences. Furthermore, while the present disclosure describes techniques that allow communications with a wireless voice and/or data network to be established using the subscriber identity data of another mobile wireless communication device in a ways that mimics using a physical SIM card from a first mobile wireless communication device on a second mobile wireless communication device, it will be appreciated that the teachings herein could be used with wireless technologies that do not have a physical SIM card, such as CDMA.

Further still, it is completed that in other embodiments, Wi-Fi network access data, such as Wi-Fi network profile data could be shared, in addition to or instead of subscriber identity data in the manner described above. Further still, while example embodiments in which the first mobile wireless communication device 110a and second mobile wireless communication device 110b communicate with NFC are described, other contactless short-range communications could be used in other embodiment. For example, another type of contactless short-range communications based on radio frequency identification (RFID) standards using magnetic field induction could be used to enable communication between the first mobile wireless communication device 110a and second mobile wireless communication device 110b.

Figure 3:
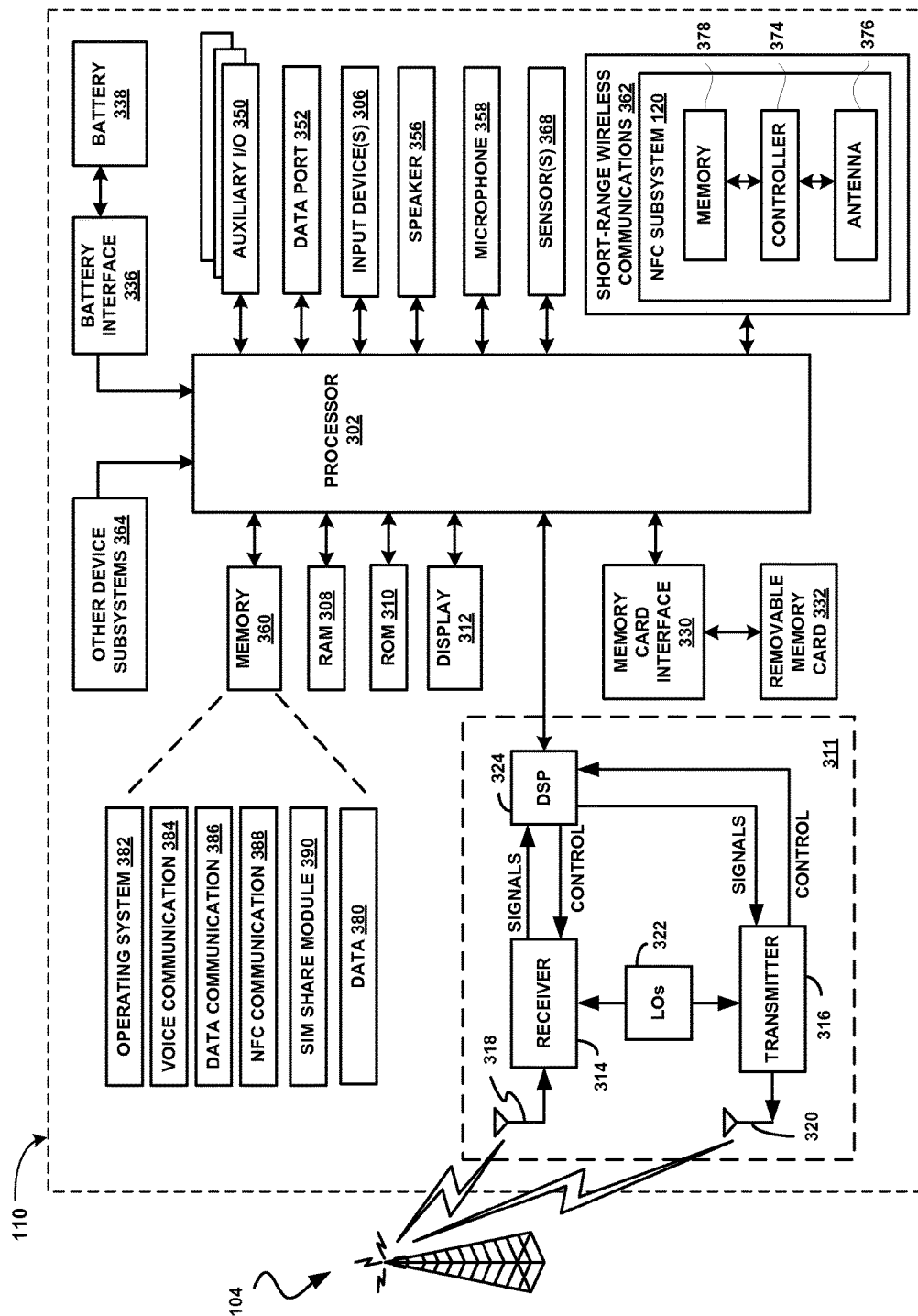
FIG. 3 is a schematic block diagram illustrating example components of a mobile wireless communications device that may be used with the wireless communication system of FIG. 1.

Reference is next made to FIG. 3 which illustrates example components of an example mobile wireless communications device 110 that may be used in accordance with the above-described embodiments. Examples of the device 110 include, but are not limited to, a mobile (or cellular) telephone, smartphone or superphone, and tablet computer. Other possible examples of the device 110 include a notebook computer (also known as a laptop, netbook or ultrabook computer depending on the device capabilities), portable or personal media player (e.g., music or MP3 players, video players, etc.), wireless organizer or personal digital assistant (PDA), portable gaming device, special purpose digital camera or wearable computer such as a smartwatch or optical head-mounted display.

The device 110 illustratively includes a rigid case or housing (not shown) which carries the electronic components of the device 110. The housing may be elongated vertically, or may take on other sizes and shapes (including clamshell housing structures). The device 110 includes a controller comprising at least one processor 302 (such as a microprocessor) which controls the overall operation of the device 110.

The processor 302 interacts with other components, such as input device(s) 306, Random Access Memory (RAM) 308, Read Only Memory (ROM) 310, wireless communications subsystem 311 for exchanging radio frequency signals with a wireless network 104, a display 312 such as a color liquid crystal display (LCD) or active-matrix organic light-emitting diode (AMOLED) display, persistent (non-volatile) memory 360 which may be flash erasable programmable read only memory (EPROM) memory (flash memory) or other suitable form of memory, sensor(s) 368 such as a motion sensor, an orientation sensor and/or proximity sensor, auxiliary input/output (I/O) subsystems 350, data port 352 such as serial data port (e.g., Universal Serial Bus (USB) data port), speaker 356, microphone 358, a short-range communications subsystem 362, and other device subsystems 364 such as a camera, global positioning system (GPS), vibrator or light-emitting diode (LED) notification light. The components of the device 110 are coupled via a communications bus (not shown) which provides a communication path between the various components.

The input device(s) 306 may include a keyboard or keypad, one or more buttons, one or more switches, a touchpad, a rocker switch, a thumbwheel, or other type of input device. In addition to or instead of a keyboard or keypad, the display 312 may be provided as part of a touchscreen or touch-sensitive display which provides an input device 306. The display 312 which together with a touch-sensitive overlay (not shown) operably coupled to an electronic controller (not shown) may comprise the touch-sensitive display. The touch-sensitive display is typically a capacitive touch-sensitive display which includes a capacitive touch-sensitive overlay.

User-interaction with a graphical user interface (GUI) presented on the display 312 performed using the input devices 306. Information, such as text, characters, symbols, images, icons, and other items are rendered and displayed on the display 312 via the processor 302. The processor 302 may interact with one or more sensors 368, such as the orientation sensor to detect direction of gravitational forces or gravity-induced reaction forces so as to determine, for example, the orientation of the device 110 in order to determine a screen orientation for the GUI.

Operating system software 382 executed by the processor 302 is stored in the persistent memory 360, such as flash memory, but may be stored in other types of memory devices, such as ROM 310 or similar storage element. User data 380 is also stored in the persistent memory 360. System software, software modules, specific device applications, or parts thereof, may be temporarily loaded into a volatile store, such as RAM 308, which is used for storing runtime data variables and other types of data or information. Communications signals received by the device 110 may also be stored in the RAM 308. Although specific functions are described for various types of memory, this is merely one example, and a different assignment of functions to types of memory could also be used.

The processor 302, in addition to its operating system functions, enables execution of software applications on the device 110. A predetermined set of applications or software modules that control basic device operations, such as voice communications module 384, data communications module 386, NFC communications module 388 and SIM share module 390, may be installed on the device 110 during manufacture. The SIM share module or application 390, when executed by the processor 302, causes the operations of method 200 to be performed.

The encryption algorithm for encrypting a shared secret of the device 110 and the decryption algorithm for decrypting the shared secret of another device are stored in the memory 360, for example, in a protected memory. The protected memory is inaccessible to users and unauthorized applications, for example, access to the protected memory may be limited to the SIM share module 390. In some embodiments, the encryption key and decryption key may be generated when needed using a key agreement protocol, thereby avoiding need to pre-share the keys. Alternatively, the encryption key and decryption key may be pre-shared using well known key exchange or key distribution techniques, and stored in the memory 360, for example, in a protected memory.

In addition, the encryption algorithm for encrypting the subscriber identity data the device 110 and the decryption algorithm for decrypting the subscriber identity data of another device are stored in the memory 360, for example, in a protected memory. The subscriber identity data to be encrypted is typically stored on a SIM card inserted in the device 110, as described below. In some embodiments, the encryption and decryption algorithms may be part of the SIM share module 390, in which case the SIM share module 390 (which includes the encryption and decryption algorithms) may be stored in a protected memory.

In addition, a personal information manager (PIM) application may be installed during manufacture. The PIM may be capable of organizing and managing data items, such as email, calendar events, voice mails, appointments, and task items. The PIM application may also be capable of sending and receiving data items via the wireless network 104. The PIM data items may be seamlessly integrated, synchronized and updated via the wireless network 104 with corresponding data items stored or associated with a host computer system. New applications and updates to installed applications may be installed by the user, for example, via the Internet.

The device 110 is a two-way wireless Radio Frequency (RF) communications device having data and/or voice communications capabilities. In addition, the device 110 may have the capability to communicate with other computer systems via the Internet. The wireless communication subsystem 311 exchanges radio frequency signals with the wireless network 104. The wireless communication subsystem 311 comprises a wireless Wide Area Network (WAN) communication subsystem for two-way communication with a wireless WAN, such as a cellular network. The device 110 may communicate with any one of a plurality of fixed transceiver base stations (not shown) of the wireless network 104 within its geographic coverage area. The device 110 may send and receive communication signals over the wireless network 104 after the required network registration or activation procedures have been completed. In addition, the wireless communication subsystem 311 may comprise a Wireless Local Area Network (WLAN) communication subsystem for two-way communication with a WLAN via wireless access points (not shown), e.g. WiFi™.

Communication functions, including data and voice communications, are performed through the communications subsystem 311 and possibly through the short-range communications subsystem 362 (e.g., using the NFC subsystem 372). Data received by the device 110 may be decompressed and decrypted by a decoder (not shown). The communications subsystem 311 includes a receiver 318, a transmitter 316, and one or more antennas 318 and 320. In addition, the communications subsystem 311 also includes a processor, such as a digital signal processor (DSP) 324, and local oscillators (LOs) 322. The specific design and implementation of the communications subsystem 311 is dependent upon the wireless communications network(s) 104 in which the device 110 is intended to operate. For example, the device 110 may include a communications subsystem 311 designed to operate with the Mobitex™, Data TAC™ or General Packet Radio Service (GPRS) mobile data communications networks, and also designed to operate with any of a variety of voice communications networks, such as Advanced Mobile Phone System (AMPS), time division multiple access (TDMA), Code Division Multiple Access (CDMA), Wideband code division multiple access (W-CDMA), Personal Communications Service (PCS), GSM (Global System for Mobile Communications), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of data and voice networks, both separate and integrated, may also be utilized with the device 110. The device 110 may also be compliant with other communications standards such as 3GSM, 3rd Generation Partnership Project (3GPP), Universal Mobile Telecommunications System (UMTS), 4G, etc.

Network access requirements vary depending upon the type of communication system. For example, in GPRS networks, network access is associated with a subscriber or user of a device. The device 110 also includes a memory card interface 330 for receiving a removable memory card 332 comprising persistent memory, such as flash memory, having subscriber identity data stored thereon. The memory card 332 can be inserted in or coupled to the memory card interface 330 for storing and reading data by the processor 302.

The memory card 332 may be a SIM card used in a GSM network or other type of memory card for use in the relevant wireless network type which provides wireless network access to a subscriber associated with the device 110. For example, the memory card 332 may be a Universal Subscriber Identity Module (USIM), Removable User Identity Module (R-UIM) or CDMA Subscriber Identity Module (CSIM) or other similar technology used in UMTS or CDMA networks. The memory card 330 is inserted in or connected to the memory card interface 332 to access the wireless network 104. In at least some embodiments, the memory card 332 is a "SIM card" in the form of a Universal Integrated Circuit Card (UICC) containing at least a SIM and a USIM application. UICC is the smart card used in mobile terminals in most contemporary GSM and UMTS networks. The term "SIM card" is intended to encompass all of the above-described types of smart cards and other similar technology. Similarly, the subscriber identity data is intended to encompass subscriber identity data stored on any of the above-described types of smart cards and other similar technology.

When required network registration or activation procedures have been completed, the mobile device 110 may send and receive communications signals over the communication network 104. Signals received by the antenna 318 through the wireless network 104 are input to the receiver 314, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 324. In a similar manner, signals to be transmitted are processed, including modulation and encoding, for example, by the DSP 324. These DSP-processed signals are input to the transmitter 316 for digital-to-analog (D/A) conversion, frequency up conversion, filtering, amplification, and transmission to the wireless network 104 via the antenna 320.

In addition to processing communications signals, the DSP 324 provides for control of the receiver 314 and the transmitter 316. For example, the gains applied to communication signals in the receiver 314 and the transmitter 316 may be adaptively controlled through automatic gain control algorithms implemented in the DSP 324.

In a data communications mode, a received signal, such as a text message or web page download, is processed by the communications subsystem 311 and is input to the processor 302. The received signal is then further processed by the processor 302 for an output to the display 312, or alternatively to some other auxiliary I/O device 350. The device 110 may also be used to compose data items, such as email messages, using the input device(s) 306 and/or some other auxiliary I/O device 350. The composed data items may then be transmitted over the communications network 104 via the communications subsystem 311.

In a voice communications mode, overall operation of the device is substantially similar to the data communications mode, except that received signals are output to a speaker 356, and signals for transmission are generated by a microphone 358. Alternative voice or audio I/O subsystems, such as a voice message recording subsystem, may also be implemented on the device 110. In addition, the display 312 may also be utilized in voice communications mode, for example to display the identity of a calling party, the duration of a voice call, or other voice call related information.

The short-range communications subsystem 362 enables communication between the device 110 and other proximate systems or devices, which need not necessarily be similar devices. The short-range communications subsystem 362 includes an NFC subsystem 372 for communicating with another mobile wireless communication device via NFC communications. The NFC subsystem 372 may also be used for communicating with an NFC device or NFC tag via NFC communications.

The NFC communications module 388 as a software module cooperates with the processor 302 through the persistent memory 360. The NFC subsystem 372 includes a NFC controller 120, an antenna 376 that communicates with another mobile wireless communication device or tag, and a persistent memory 378. The NFC communications module 388 allows the processor 302 to control the NFC subsystem 132. The antenna 376 is tuned typically for 13.56 MHz. The persistent memory 378 is used to store the subscriber identity data, the shared secret for accessing the subscriber identity data, and possibly other data. As noted above, the subscriber identity data and the shared secret for accessing the subscriber identity data may be stored in encrypted form. The NFC subsystem 120 is configured for operating in either an active communication mode or a passive communication mode, as described above.

The NFC controller 120 could be, for example, a PN531 microcontroller-based transmission module from the Phillips Semiconductor Branch of Koninklijke Phillips Electronics N.V. When the NFC controller is a PN531 module, the NFC controller 120 could include analog circuitry and a contact list Universal Asynchronous Receiver Transmitter (UART), a core and a set of host interfaces. The analog circuitry could include an output driver, an integrated demodulator, a bit decoder, a mode detector and an RF-level detector. The contact list UART could include elements for data processing, Cyclical Redundancy Checking (CRC), parity generation, framing generation and check bit coding and decoding. The core typically includes an 80051 microcontroller, 32 Kbyte of ROM and one Kbyte of RAM. A set of host interfaces can interface with the microprocessor and interface according to such known standards as I2C, serial UART, SPI and USB.

The short-range communications subsystem 362 may also include devices, associated circuits and components for providing other types of short-range wireless communication such as Bluetooth™, IEEE 802.11, IEEE 802.15.3a (also referred to as UltraWideband (UWB)), Z-Wave, ZigBee, or infrared such as an Infrared Data Association (IrDA) communications, as well as a corresponding communications module in persistent memory 360 to provide for communication with similarly-enabled systems and devices.

The device 110 also includes a battery 338 as a power source, which is typically one or more rechargeable batteries that may be charged, for example, through charging circuitry coupled to a battery interface such as the serial data port 352. The battery 338 provides electrical power to at least some of the components of the device 110, and the battery interface 336 provides a mechanical and electrical connection for the battery 338. The battery interface 336 is coupled to a regulator (not shown) which provides power V+ to the circuitry of the device 110.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for establishing communications on one communication device using the subscriber identity data of another communication device, the method comprising:
    establishing a contactless short-range communication connection between a first mobile wireless communications device and a second mobile wireless communications device;
    receiving, by the second mobile wireless communications device, subscriber identity data and a shared secret from the first mobile wireless communications device, wherein the subscriber identity data is received in encrypted form;
    receiving, on the second mobile wireless communications device, input via an input device;
    determining, on the second mobile wireless communications device, whether the received input matches the shared secret;
    decrypting, on the second mobile wireless communications device, the subscriber identity data using the shared secret; and
    establishing, by the second mobile wireless communications device, a wireless voice and/or data communication session using the decrypted subscriber identity data.

2. The method of claim 1, wherein both the subscriber identity data and the shared secret are received from the first mobile wireless communications device in encrypted form.

3. The method of claim 2, further comprising:
    decrypting, on the second mobile wireless communications device, the shared secret.

4. The method of claim 3, wherein the shared secret is decrypted using a decryption key stored in a protected memory of the second mobile wireless communications device.

5. The method of claim 3, wherein the shared secret is decrypted using a decryption algorithm stored in a protected memory of the second mobile wireless communications device.

6. The method of claim 1, wherein the contactless short-range communication is a near field communication (NFC) connection, and the subscriber identity data and shared secret are stored in a memory of an NFC subsystem of the first mobile wireless communications device.

7. The method of claim 1, wherein the subscriber identity data is encrypted on the first mobile wireless communications device using a symmetric-key algorithm having the shared secret as an encryption key, and the subscriber identity data is decrypted on the second mobile wireless communications device using the symmetric-key algorithm with the shared secret as the decryption key.

8. The method of claim 7, wherein the symmetric-key algorithm is stored in a protected memory of the second mobile wireless communications device.

9. The method of claim 8, wherein the protected memory of the second mobile wireless communications device is inaccessible to unauthorized applications.

10. The method of claim 1, wherein the wireless voice and/or data communication session is established as a secure session in which applications and data used in the wireless voice and/or data communication session are segregated from applications and data stored locally on the second mobile wireless communications device, and in which data used in the wireless voice and/or data communication session is deleted when the data used in the wireless voice and/or data communication session ends.

11. The method of claim 1, wherein the contactless short-range communication is a near field communication (NFC) connection.

12. The method of claim 11, further comprising:
storing, by the first mobile wireless communications device, the subscriber identity data in the memory of the NFC subsystem of the first mobile wireless communications device when a low battery condition is detected by the first mobile wireless communications device.

13. The method of claim 11, wherein the NFC connection is established with the first mobile wireless communications device in a passive communication mode and the second first mobile wireless communications device in an active communication mode, wherein the second mobile wireless communications device is an initiator device and the first mobile wireless communications device is a target device.

14. The method of claim 13, wherein the first mobile wireless communications device is powered-off or in a low power state when the NFC connection is established.

15. A mobile wireless communication device, comprising:
a contactless short-range communication subsystem;
an input device;
a wireless communication subsystem;
a controller coupled to the contactless short-range communication subsystem, input device and wireless communication subsystem, the controller configured for:
establishing a contactless short-range communication connection between a first mobile wireless communications device and a second mobile wireless communications device;
receiving, by the second mobile wireless communications device, subscriber identity data and a shared secret from the first mobile wireless communications device, wherein the subscriber identity data is received in encrypted form;
receiving, on the second mobile wireless communications device, input via an input device;
determining, on the second mobile wireless communications device, whether the received input matches the shared secret;
decrypting, on the second mobile wireless communications device, the subscriber identity data using the shared secret; and
establishing, by the second mobile wireless communications device, a wireless voice and/or data communication session using the decrypted subscriber identity data.

16. The mobile wireless communication device of claim 15, wherein the subscriber identity data and the shared secret are both received from the first mobile wireless communications device in encrypted form, the controller further configured for decrypting, on the second mobile wireless communications device, the shared secret.

17. The mobile wireless communication device of claim 15, wherein the contactless short-range communication is a near field communication (NFC) connection, and the subscriber identity data and shared secret are stored in a memory of an NFC subsystem of the first mobile wireless communications device.

18. The mobile wireless communication device of claim 15, wherein the subscriber identity data is encrypted on the first mobile wireless communications device using a symmetric-key algorithm having the shared secret as an encryption key, and the subscriber identity data is decrypted on the second mobile wireless communications device using the symmetric-key algorithm with the shared secret as the decryption key.

19. A non-transitory machine readable medium having tangibly stored thereon executable instructions that, when executed by a controller of a mobile wireless communications device, cause the controller to perform a method for establishing communications on one communication device using the subscriber identity data of another communication device, the method comprising:
establishing a contactless short-range communication connection between a first mobile wireless communications device and a second mobile wireless communications device;
receiving, by the second mobile wireless communications device, subscriber identity data and a shared secret from the first mobile wireless communications device, wherein the subscriber identity data is received in encrypted form;
receiving, on the second mobile wireless communications device, input via an input device;
determining, on the second mobile wireless communications device, whether the received input matches the shared secret;
decrypting, on the second mobile wireless communications device, the subscriber identity data using the shared secret; and
establishing, by the second mobile wireless communications device, a wireless voice and/or data communication session using the decrypted subscriber identity data.

20. A communication system comprising:
a first mobile wireless communications device comprising:
a contactless short-range communication subsystem;
a memory;
a wireless communication subsystem;
a controller coupled to the contactless short-range communication subsystem, memory and wireless communication subsystem, the controller configured for:
encrypting subscriber identity data and a shared secret; and storing the encrypted subscriber identity data and shared secret in the memory of the contactless short-range communication subsystem when a low battery condition is detected;

a second mobile wireless communications device comprising:

a contactless short-range communication subsystem;

an input device;

a wireless communication subsystem;

a controller coupled to the contactless short-range communication subsystem, input device and wireless communication subsystem, the controller configured for:

establishing a contactless short-range communication connection between a first mobile wireless communications device and a second mobile wireless communications device;

receiving, by the second mobile wireless communications device, subscriber identity data and a shared secret from the first mobile wireless communications device, wherein the subscriber identity data is received in encrypted form;

receiving, on the second mobile wireless communications device, input via an input device;

determining, on the second mobile wireless communications device, whether the received input matches the shared secret;

decrypting, on the second mobile wireless communications device, the subscriber identity data using the shared secret; and establishing, by the second mobile wireless communications device, a wireless voice and/or data communication session using the decrypted subscriber identity data.

* * * * *